US012580356B2

(12) United States Patent
Brantingham et al.

(10) Patent No.: US 12,580,356 B2
(45) Date of Patent: Mar. 17, 2026

(54) METHOD OF ASSEMBLING AN ELECTRICAL CONNECTOR AND AN ELECTRICAL CONNECTOR

(71) Applicant: Aptiv Technologies AG, Schaffhausen (CH)

(72) Inventors: Duane Brantingham, Cortland, OH (US); David R. Peterson, Aurora, OH (US)

(73) Assignee: Aptiv Technologies AG, Schaffhausen (CH)

(*) Notice: Subject to any disclaimer, the term of this patent is extended or adjusted under 35 U.S.C. 154(b) by 281 days.

(21) Appl. No.: 18/228,859

(22) Filed: Aug. 1, 2023

(65) Prior Publication Data

US 2025/0047051 A1 Feb. 6, 2025

(51) Int. Cl.
*H01R 43/20* (2006.01)
*H01R 24/60* (2011.01)

(52) U.S. Cl.
CPC ............. *H01R 43/20* (2013.01); *H01R 24/60* (2013.01)

(58) Field of Classification Search
CPC .. H01R 24/60; H01R 13/502; H01R 13/6581; H01R 2201/06; H01R 13/6594; H01R 13/6597
See application file for complete search history.

(56) References Cited

U.S. PATENT DOCUMENTS 4,346,959 A 8/1982 Daugherty et al.
4,895,534 A 1/1990 Klunk et al.
5,409,405 A 4/1995 Bungo
9,356,405 B1 * 5/2016 Skagmo ............. H01R 13/5202
11,411,334 B2 8/2022 Peterson et al.
2014/0094049 A1 4/2014 Ohyama et al.
2021/0265748 A1 8/2021 Scharkowski
2023/0007908 A1 1/2023 Cabañero

FOREIGN PATENT DOCUMENTS

EP 2779318 A1 9/2014
JP 2014067660 A 4/2014
JP 2022120483 A 8/2022

OTHER PUBLICATIONS

"Machine translation of JP2014067660A", 11 Pages.
"Machine translation of JP2022120483A", 10 pages.
"Notification to Pay Further Search Fee (Rule 64)"; European Patent Office; Mailed on Dec. 18, 2024; 18 Pages.
"Extended European Search Report for Appl. No. 24189183.7"; European Patent Office; mailed on Mar. 18, 2025; 24 Pages.

* cited by examiner

*Primary Examiner* — Joseph Ortega
(74) *Attorney, Agent, or Firm* — Billion & Armitage

(57) ABSTRACT

A method of assembling an electrical connector includes the steps of providing an insulated flexible flat cable having a plurality of electrical conductors, inserting the flat cable within a connector housing, inserting the flat cable within a terminal housing, attaching a plurality of electrical terminals to the plurality of electrical conductors, pulling the flat cable to draw the plurality of electrical terminals within a plurality of terminal cavities defined in the terminal housing, and pulling the flat cable to further draw the terminal housing within the connector housing. An electrical connector assembly which may be made by this method is also disclosed.

18 Claims, 8 Drawing Sheets

METHOD OF ASSEMBLING AN ELECTRICAL CONNECTOR AND AN ELECTRICAL CONNECTOR

TECHNICAL FIELD

The disclosure generally relates to a method of assembling an electrical connector and an electrical connector assembly, for example one produced using such a method.

BACKGROUND

The desire to provide electrical connection systems that are easier to assemble using automated processes and are easier to route in vehicles has led to a movement away from traditional round wire harnesses to flat wire harnesses in automobiles and other vehicles.

SUMMARY

According to one or more aspects of the present disclosure, a method of assembling an electrical connector includes the steps of:

(a) providing an insulated flexible flat cable having a plurality of electrical conductors;
(b) inserting the flat cable within a connector housing;
(c) inserting the flat cable within a terminal housing;
(d) attaching a plurality of electrical terminals to the plurality of electrical conductors;
(e) pulling the flat cable to draw the plurality of electrical terminals within a plurality of terminal cavities defined in the terminal housing; and
(f) pulling the flat cable to further draw the terminal housing within the connector housing.

In some aspects of the method described in the previous paragraph, the plurality of electrical terminals are formed of unfolded sheet metal. The method may further include the step of:

(h) attaching the plurality of electrical terminals to the plurality of electrical conductors.

In some aspects of the method described in any one of the previous paragraphs, the plurality of electrical conductors have a generally rectangular cross section. The method may further include the steps of:

(i) removing insulation from ends of the plurality of electrical conductors, thereby exposing portions of the plurality of electrical conductors; and
(j) folding the plurality of electrical conductors over edges of the plurality of electrical terminals.

In some aspects of the method described in any one of the previous paragraphs, the plurality of electrical terminals are selected from a list consisting of male blade terminals and female tuning fork terminals.

In some aspects of the method described in any one of the previous paragraphs, the terminal housing includes a terminal housing to connector housing seal. The method may further include the steps of:

(k) inserting the flat cable within a cable to terminal housing seal; and
(l) pulling the flat cable to draw the terminal housing seal within a seal cavity defined in the terminal housing.

In some aspects of the method described in the previous paragraph, step (i) occurs prior to step (c).

In some aspects of the method described in any one of the previous paragraphs, the method may further include the step of:

(m) attaching a terminal cap to the terminal housing.

In some aspects of the method described in any one of the previous paragraphs, the terminal cap defines a plurality of rectangular protrusions located between the plurality of electrical terminals. The terminal housing defines a plurality of slots located between the plurality of electrical terminals in which the plurality of rectangular protrusions are received.

In some aspects of the method described in any one of the previous paragraphs, the method may further include the steps of:

(n) removing insulation from ends of the plurality of electrical conductors, thereby exposing portions of the plurality of electrical conductors;
(o) cutting notches in the insulation between the exposed portions of the plurality of electrical conductors; and
(p) placing ends of the plurality of rectangular protrusions within the notches.

According to one or more aspects of the present disclosure, an electrical connector is produced by a process that includes the steps of:

(a) providing an insulated flexible flat cable having a plurality of electrical conductors;
(b) inserting the flat cable within a connector housing;
(c) inserting the flat cable within a terminal housing;
(d) attaching a plurality of electrical terminals to the plurality of electrical conductors;
(e) pulling the flat cable to draw the plurality of electrical terminals within a plurality of terminal cavities defined in the terminal housing; and
(f) pulling the flat cable to further draw the terminal housing within the connector housing.

In some aspects of the electrical connector described in the previous paragraph, the plurality of electrical terminals are formed of unfolded sheet metal. The process may further include the step of:

(h) attaching the plurality of electrical terminals to the plurality of electrical conductors.

In some aspects of the electrical connector described in any one of the previous paragraphs, the plurality of electrical conductors have a generally rectangular cross section. The process may further include the steps of:

(i) removing insulation from ends of the plurality of electrical conductors, thereby exposing portions of the plurality of electrical conductors; and
(j) folding the plurality of electrical conductors over edges of the plurality of electrical terminals.

In some aspects of the electrical connector described in any one of the previous paragraphs, the plurality of electrical terminals are selected from a list consisting of male blade terminals and female tuning fork terminals.

In some aspects of the electrical connector described in any one of the previous paragraphs, the terminal housing includes a terminal housing to connector housing seal. The process may further include the steps of:

(k) inserting the flat cable within a cable to terminal housing seal; and
(l) pulling the flat cable to draw the terminal housing seal within a seal cavity defined in the terminal housing.

In some aspects of the electrical connector described in the previous paragraph, step (I) of the process occurs prior to step (c).

In some aspects of the electrical connector described in any one of the previous paragraphs, the process may further include the step of:

(m) attaching a terminal cap to the terminal housing.

In some aspects of the electrical connector described in any one of the previous paragraphs, the terminal cap defines a plurality of rectangular protrusions located between the plurality of electrical terminals. The terminal housing defines a plurality of slots located between the plurality of electrical terminals in which the plurality of rectangular protrusions are received.

In some aspects of the electrical connector described in any one of the previous paragraphs, the process may further include the steps of:

(n) removing insulation from ends of the plurality of electrical conductors, thereby exposing portions of the plurality of electrical conductors;

(o) cutting notches in the insulation between the exposed portions of the plurality of electrical conductors; and (p) placing ends of the plurality of rectangular protrusions within the notches.

According to one or more aspects of the present disclosure, an electrical connector assembly includes an insulated flexible flat cable having a plurality of electrical conductors. A portion of each of the plurality of electrical conductors is exposed; a plurality of electrical terminals formed of unfolded sheet metal and attached to the plurality of electrical conductors. The plurality of electrical conductors are folded over edges of the exposed portions of the plurality of electrical conductors. The electrical connector assembly also includes a terminal housing having a plurality of terminal cavities in which the plurality of electrical terminals is disposed and a terminal cap that is attached to an end of the terminal housing. The electrical connector assembly further includes a connector housing in which the terminal housing is disposed.

In some aspects of the electrical connector assembly described in the previous paragraph, the terminal cap defines a plurality of rectangular protrusions located between the plurality of electrical terminals and wherein the terminal housing defines a plurality of slots located between the plurality of electrical terminals in which the plurality of rectangular protrusions are received.

In some aspects of the electrical connector assembly described in the previous paragraph, the flat cable defines notches in the insulation between the exposed portions of the plurality of electrical conductors and ends of the plurality of rectangular protrusions are disposed within the notches.

In some aspects of the electrical connector assembly described in any one of the previous paragraphs, the plurality of electrical terminals are selected from a list consisting of male blade terminals and female tuning fork terminals.

BRIEF DESCRIPTION OF THE DRAWINGS

The present invention will now be described, by way of example with reference to the accompanying drawings, in which.

DETAILED DESCRIPTION

Figure 1:
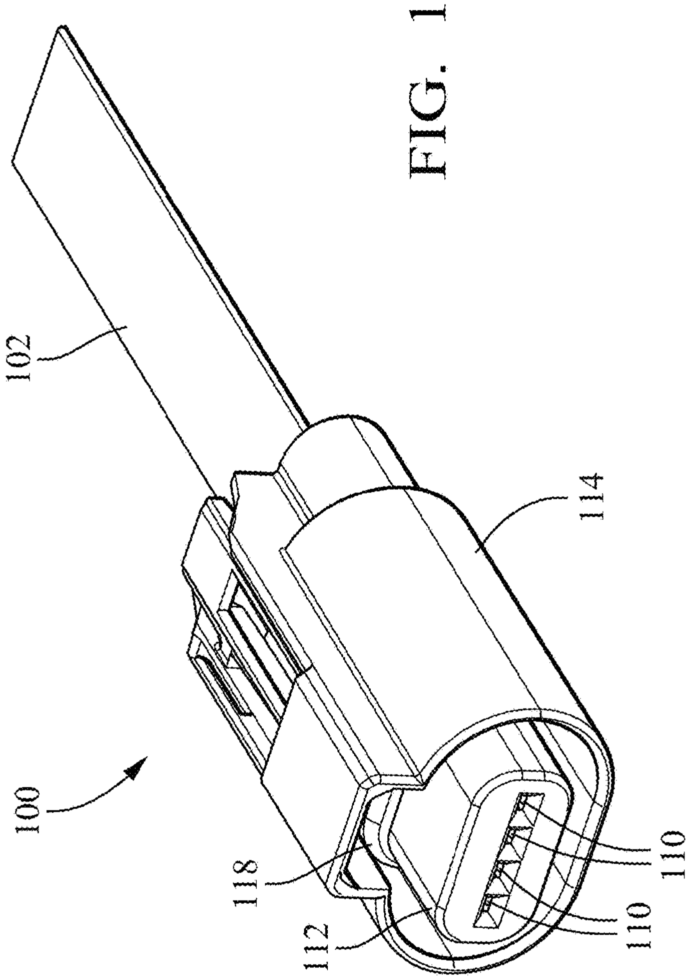
FIG. 1 is an isometric view of an electrical connector according to some embodiments.

A nonlimiting example of an electrical connector 100 shown in FIG. 1 which includes an insulated flexible flat cable 102 that has a plurality of electrical conductors 104, a terminal housing 106 having a plurality of terminal cavities 108 in which the plurality of electrical terminals 110 is disposed, a terminal cap 112 attached to an end of the terminal housing 106, and a connector housing 114 in which the terminal housing 106 is disposed.

Figure 2:
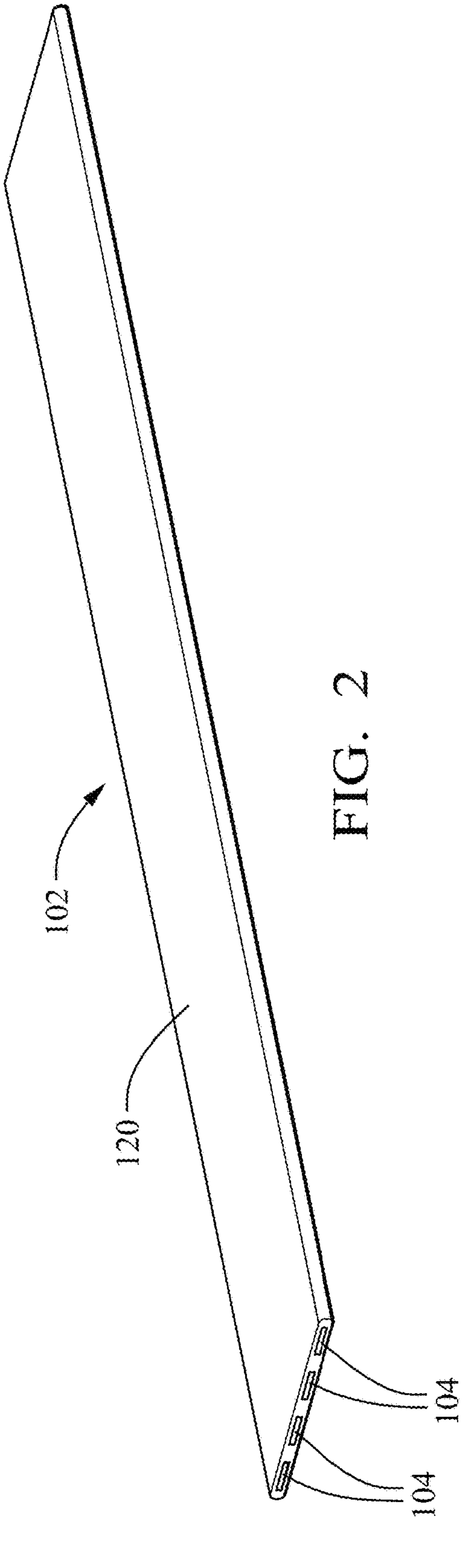
FIG. 2 is a flow chart of a method of assembling an electrical connector according to some embodiments.

The steps of a nonlimiting method 200 of assembling the electrical connector 100 are illustrated in FIGS. 2-12. In STEP 202 of the method 200, the flat cable 102 is provided as shown in FIG. 2. In this example the flat cable includes electrical conductors 104 having a rectangular cross section joined by a single insulative sheath, such as those in a flat flexible cable (FFC) or flexible printed circuit (FPC). Alternatively, the electrical conductors may have a square, round, or oval cross section, such as in a ribbon cable. In an additional alternative, the flat cable may be replaced with a cable formed of a bundle of individually insulated electrical conductors.

Figure 3:
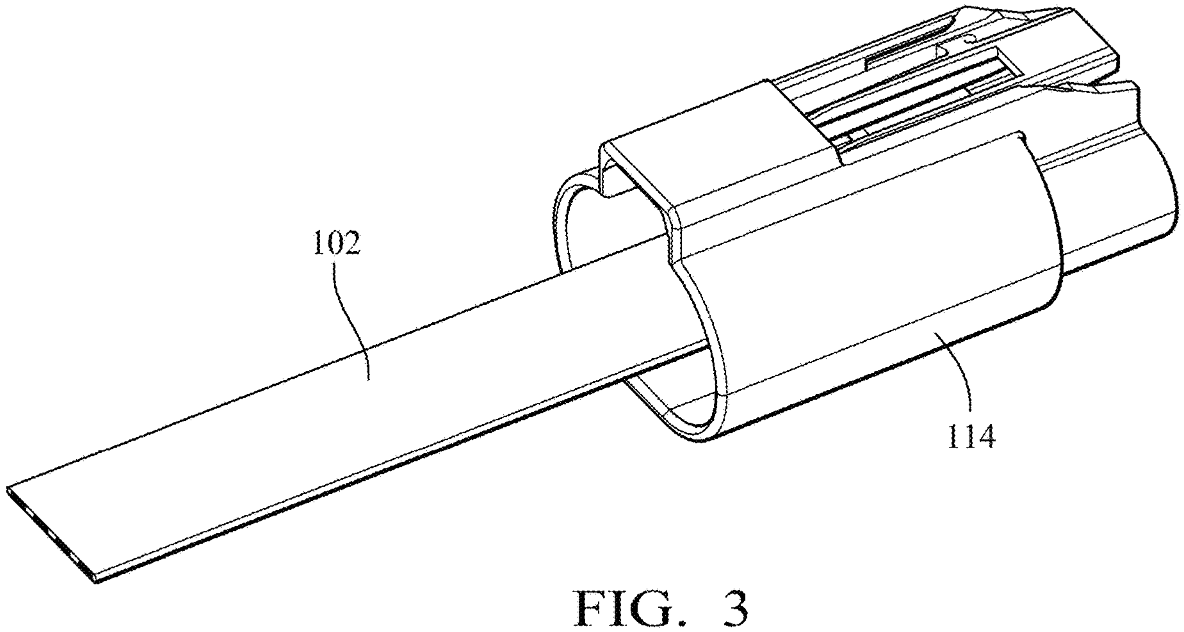
FIG. 3 is an isometric view of an electrical cable of the electrical connector of FIG. 1 according to some embodiments.

In STEP 204 of the method 200, the flat cable 102 is inserted within the connector housing 114 which has an opening on both ends and defines a connector cavity within as shown in FIG. 3.

Figure 4:
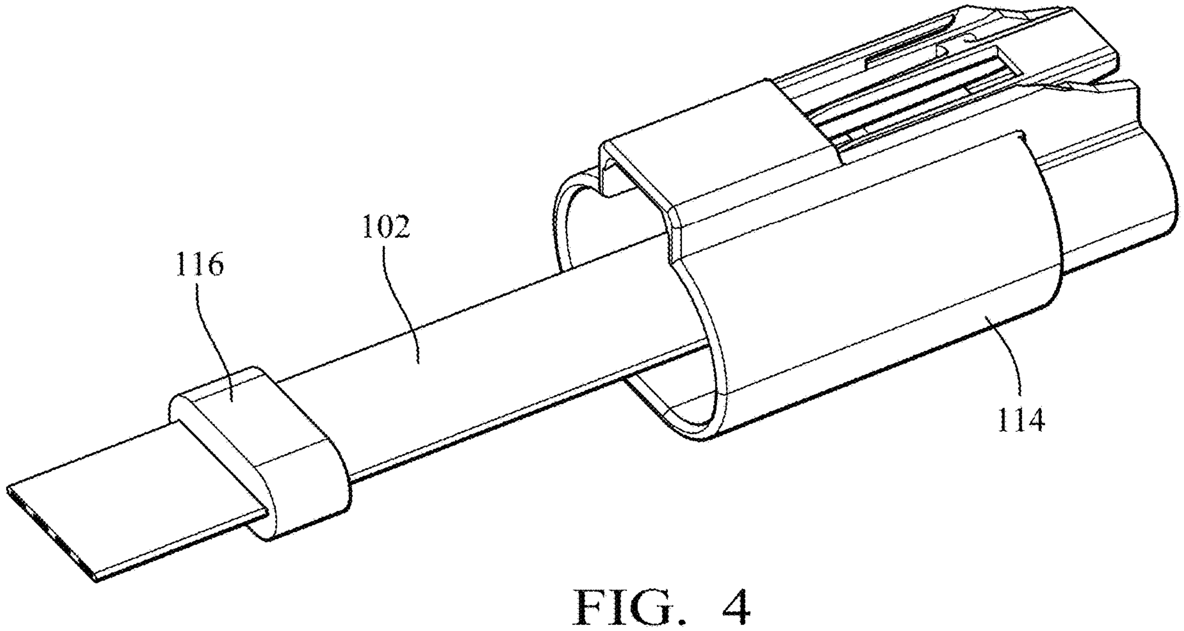
FIG. 4 is an isometric view of a subassembly of the electrical connector of FIG. 1 in which the electrical cable of FIG. 3 inserted within a connector housing according to some embodiments.

As illustrated in FIG. 4, a cable seal 116 is placed over the flat cable 102 which corresponds to STEP 222 of the method 200. The cable seal 116 may be stretched, or a lubricant may be applied to the flat cable 102 and/or cable seal 116 to facilitate sliding the cable seal 116 over the flat cable 102. STEP 222 may be eliminated if the electrical connector is used in an unsealed application.

Figure 5:
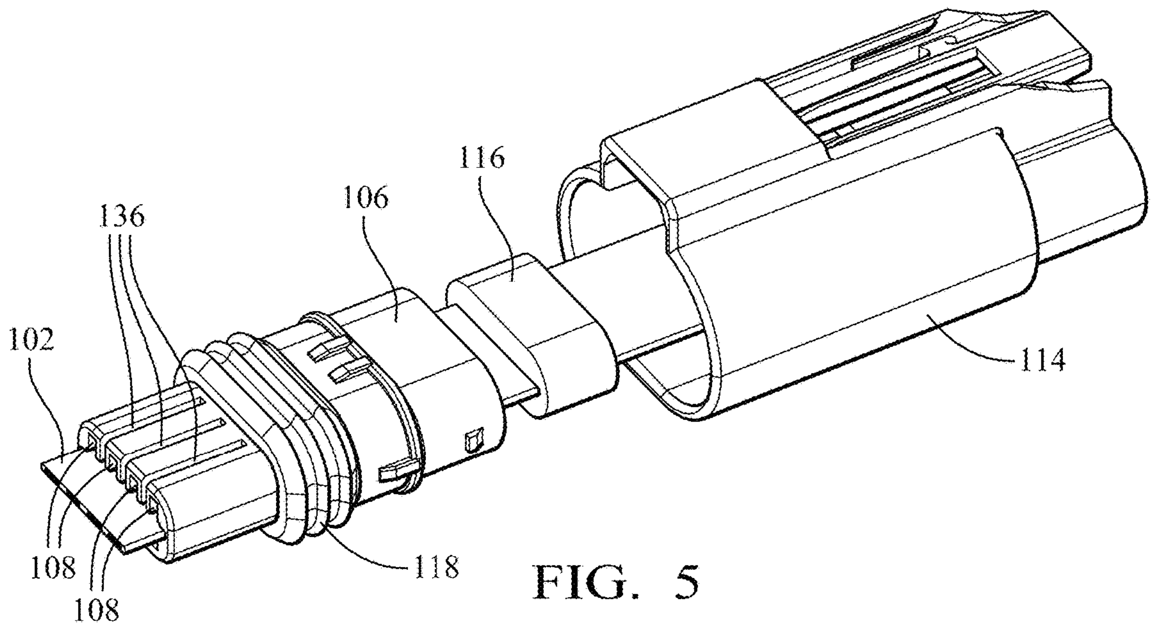
FIG. 5 is an isometric view of a subassembly of the electrical connector of FIG. 1 in which a cable seal is placed over the electrical cable of the subassembly of FIG. 4 according to some embodiments.

In STEP 206 of the method 200, the flat cable 102 is inserted within the terminal housing 106 as shown in FIG. 5. The terminal housing 106 has the plurality of terminal cavities 108 and a cable cavity (not shown) extending therethrough. The terminal housing 106 as shown in FIG. 5 also includes a terminal housing seal 118 that is drawn into a seal cavity (not shown) of the connector housing 112 by pulling the flat cable 102 per STEP 224 of the method 200. The terminal housing seal 118 may be eliminated if the electrical connector is used in an unsealed application.

Figure 6:
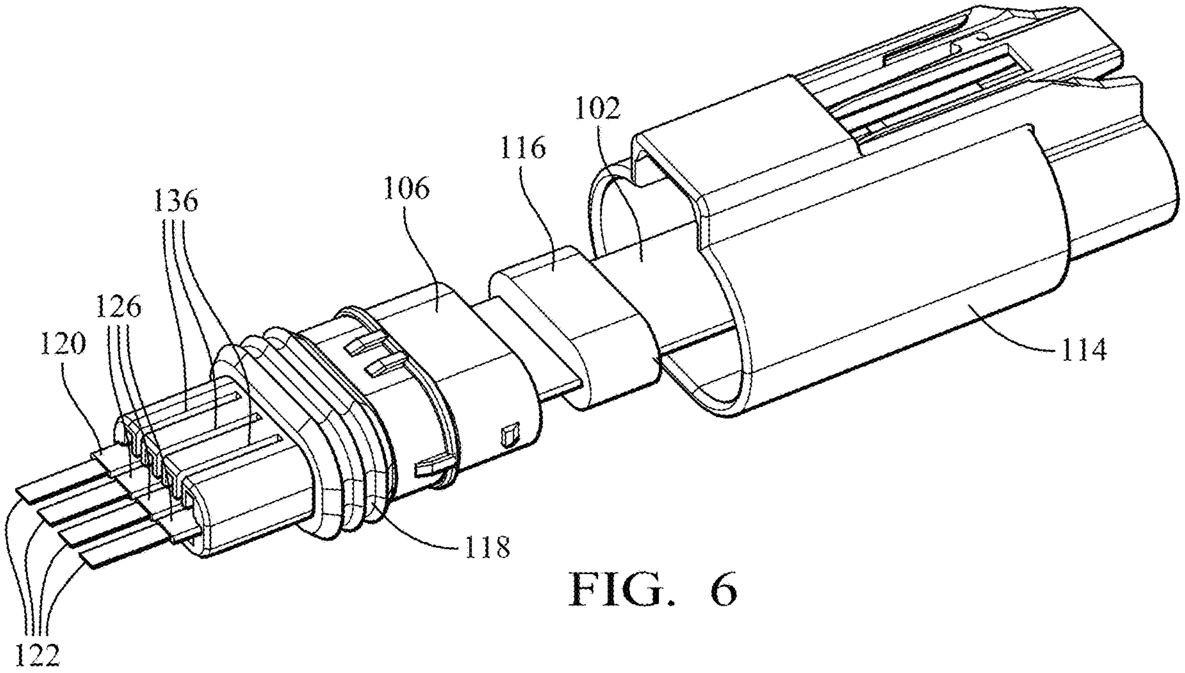
FIG. 6 is an isometric view of a subassembly of the electrical connector of FIG. 1 in which a terminal housing is placed over the electrical cable of the subassembly of FIG. 5 according to some embodiments.

As shown by FIG. 6, insulation 120 of the flat cable 102 is removed from ends of the electrical conductors 104 per STEP 218 or 228 of the method 200, thereby providing exposed portions 122 of the electrical conductors 104. In addition, notches 126 are cut into the insulation 120 between the exposed portions 122 per STEP 230 of the method 200. Preferably STEP 220 or 228 is performed prior to STEP 206 of the method 200.

Figure 7:
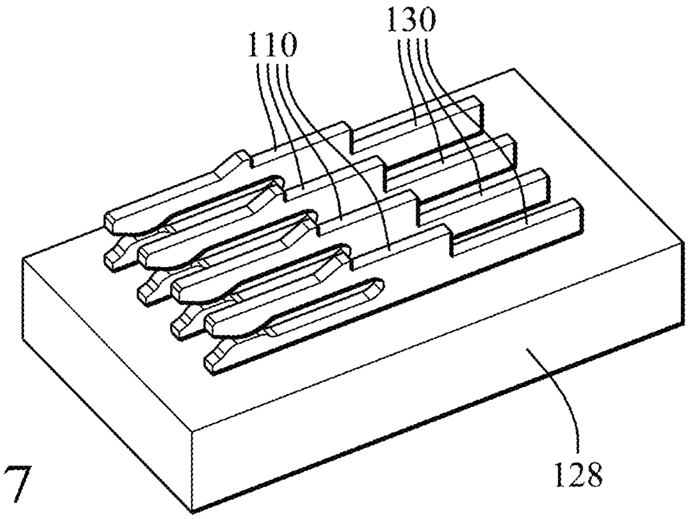
FIG. 7 is an isometric view of a subassembly of the electrical connector of FIG. 1 in which insulation is stripped from the electrical cable of the subassembly of FIG. 6 to expose the conductors according to some embodiments.

In STEP 214 of the method 200, the electrical terminals 110 may be placed into a jig 128 that is configured to hold the electrical terminals 110 in place as they are attached to the exposed portions 122 of the electrical conductors 104 as illustrated by FIG. 7. The electrical terminals 110 illustrated here are female tuning fork terminals which are formed from unfolded sheet metal. Alternatively, the terminals may be male blade terminals that are formed from unfolded sheet metal. In an additional alternative, the terminals may be socket or pin terminals formed by any number of metal forming processes.

Figure 8:
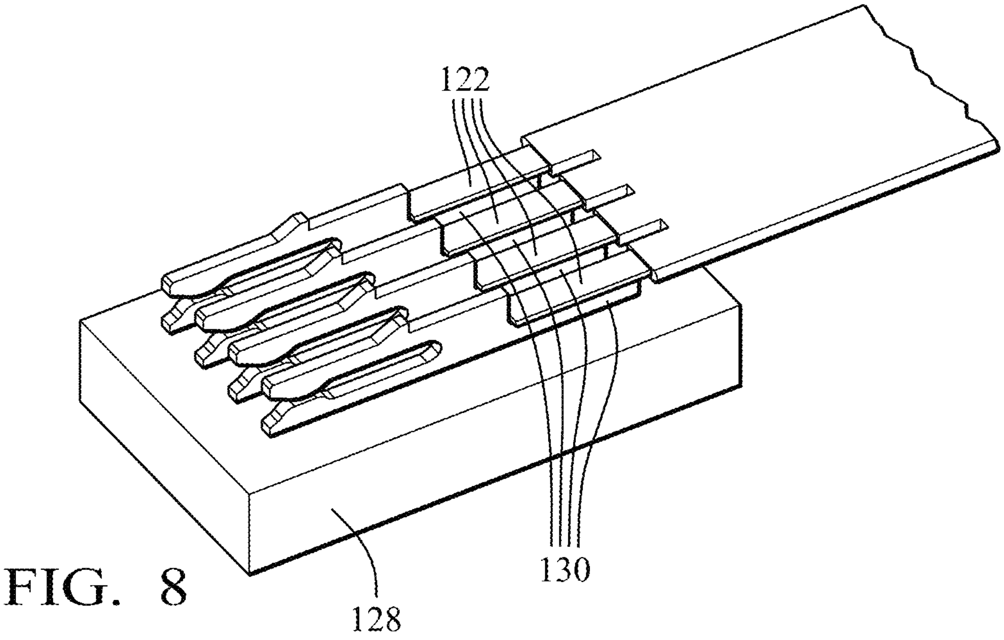
FIG. 8 is an isometric view of electrical terminal held in a jig according to some embodiments.
Figure 9:
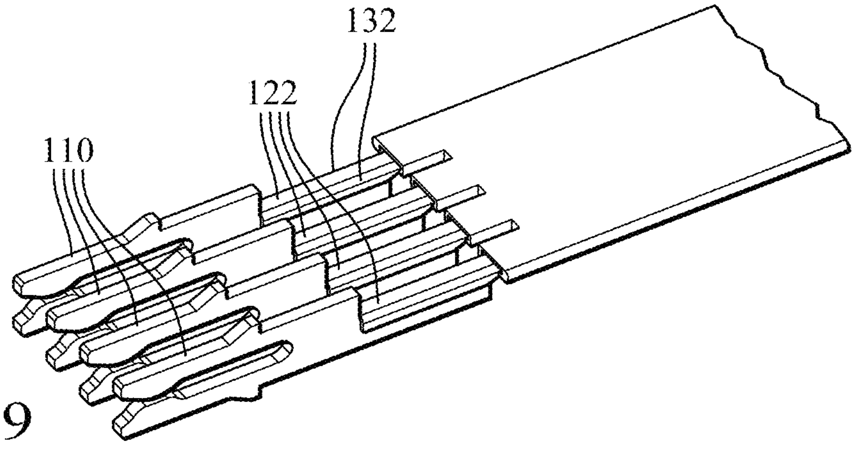
FIG. 9 is an isometric view of the electrical terminal held in the jig of FIG. 8 being attached to the exposed conductors of the subassembly of FIG. 6 according to some embodiments.

As shown in FIG. 8, the exposed portions 122 of the electrical conductors 104 are laid over the attachment portion 130 of the electrical terminals 110 and are attached to the attachment portion 130 per STEP 208 of the method 200. This is preferably accomplished by a welding process such as laser welding, ultrasonic welding, braising, or soldering. Alternatively, the exposed portions 122 may attached to the attachment portions 130 using an electrically conductive adhesive or mechanical crimping process. As illustrated in FIG. 9, the exposed portions 122 of the electrical conductors 104 are folded over edges 132 of the attachment portion 130 to increase the contact surface area between the electrical conductors 104 and the electrical terminals 110.

Figure 10:
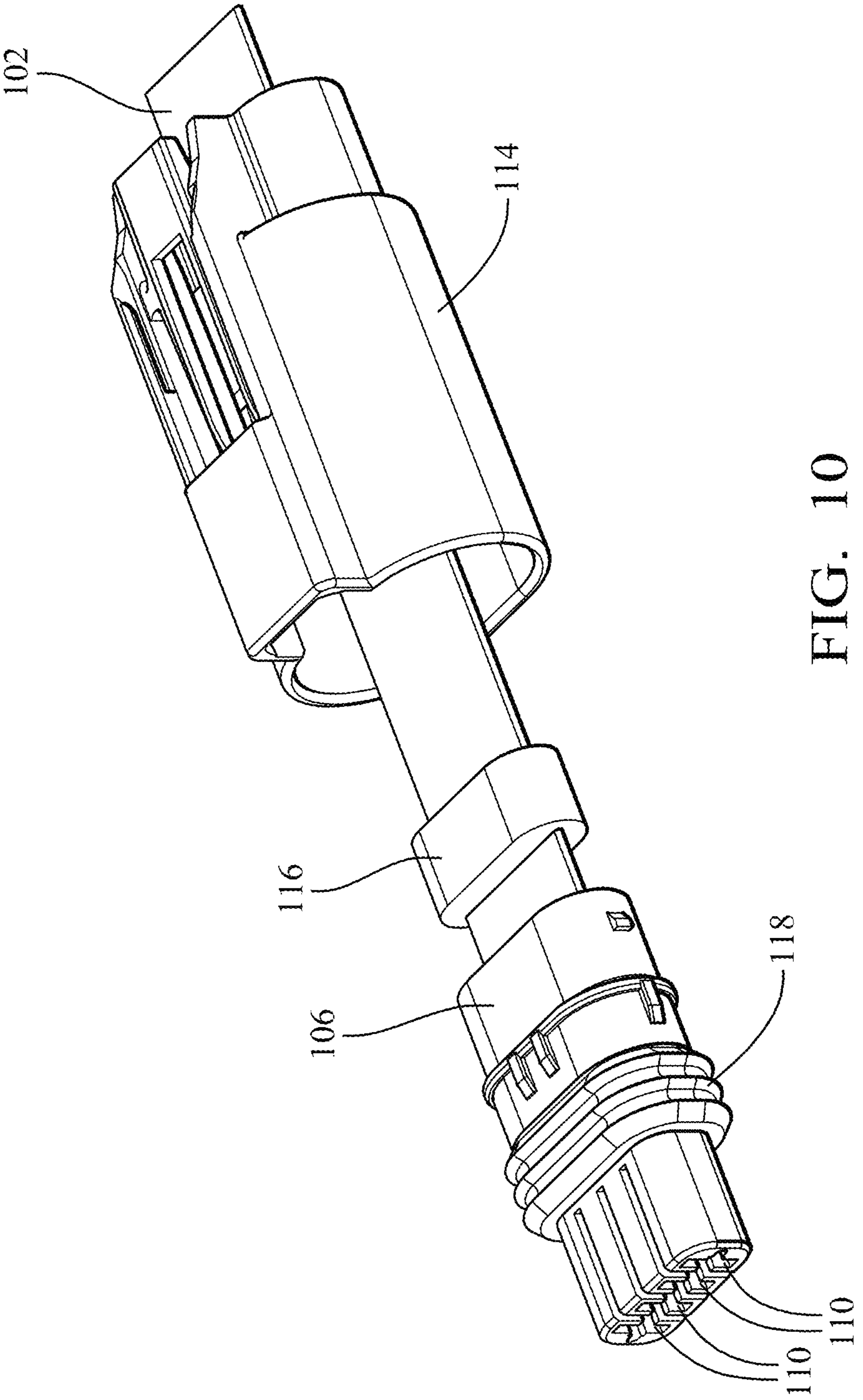
FIG. 10 is an isometric view of the exposed conductors of FIG. 9 folded over the electrical terminals according to some embodiments.

In STEP 210 of the method 200, the electrical terminals 110 have been removed from the jig 128 and the flat cable 102 is pulled to draw the electrical terminals 110 within the terminal cavities 108 in the terminal housing 106 as shown in FIG. 10.

Figure 11:
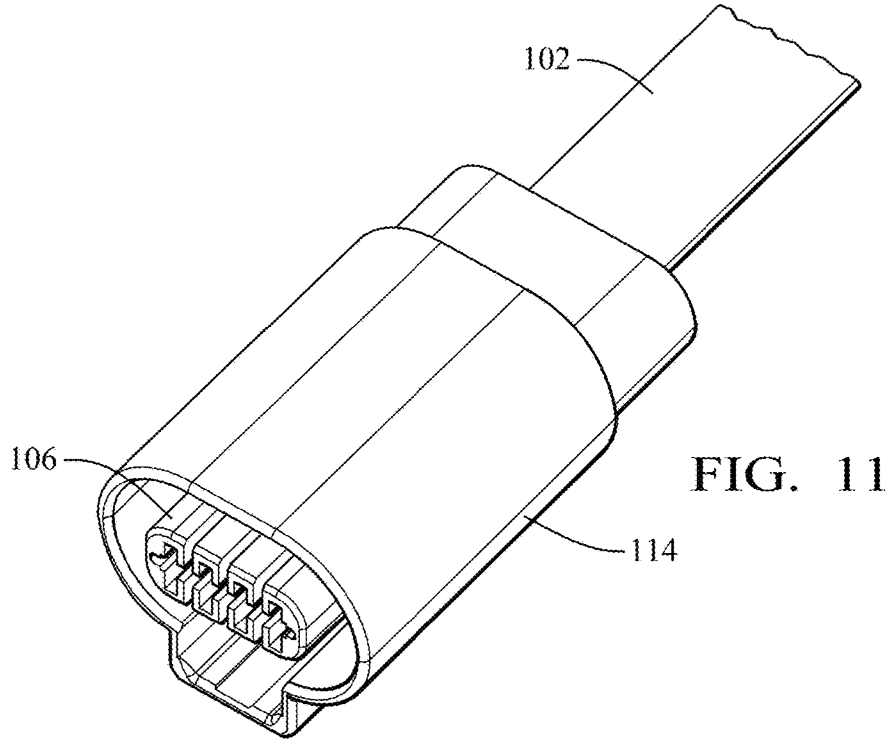
FIG. 11 is an isometric view of a subassembly of the electrical connector of FIG. 1 after the electrical cable and electrical terminals have been pulled within the terminal housing of the subassembly of FIG. 7 in an embodiment of the invention.
Figure 12:
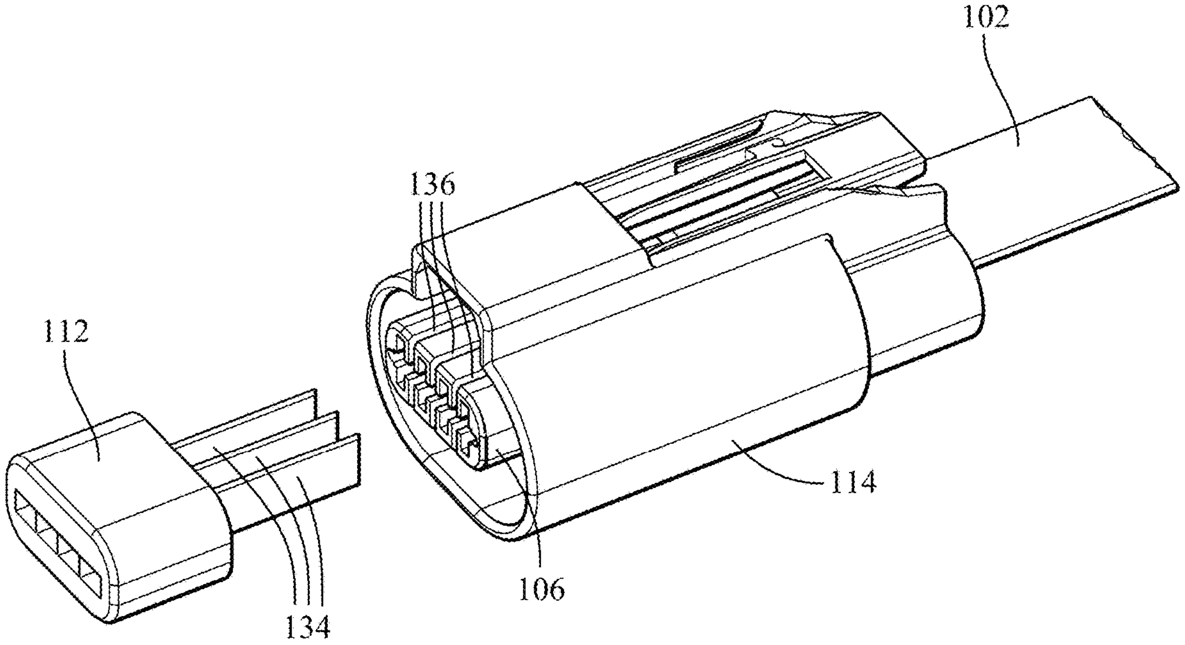
FIG. 12 is an isometric view of a subassembly of the electrical connector of FIG. 1 after the terminal housing has been pulled within the connector housing of the subassembly of FIG. 11 in an embodiment of the invention.

In STEP 212 of the method 200, the flat cable 102 is pulled further to draw the terminal housing seal 118 within a seal cavity (not shown) defined in the terminal housing 106 and pulled even further to draw the terminal housing 106 into the connector housing 114 as shown in FIG. 11.

In STEP 226 of the method 200, the terminal cap 112, which is configured to retain the electrical terminals 110 within the terminal cavities 108, is attached to an end of the terminal housing 106. The terminal cap 112 defines a plurality of rectangular protrusions 134 shown in FIG. 12 that are formed of an electrically insulative material that are inserted between the electrical terminals 110. The terminal housing 106 defines a plurality of slots 136. The slots 136 are located between the electrical terminals 110 and the rectangular protrusions 134 are received in these slots 136. The ends of the rectangular protrusions 134 are received in the notches 126 in the insulation 120 per STEP 232 of the method 200. These rectangular protrusions 134 electrically insulate the electrical terminals 110 from one another and the notches 126 provide a tortuous path between the electrical terminals 110 thereby increasing the creepage distance needed for high voltage applications, e.g., greater than 48 volts. The protrusions and notches may be eliminated in low voltage applications of the electrical connector 100, e.g., less than 48 volts.

Figure 13:
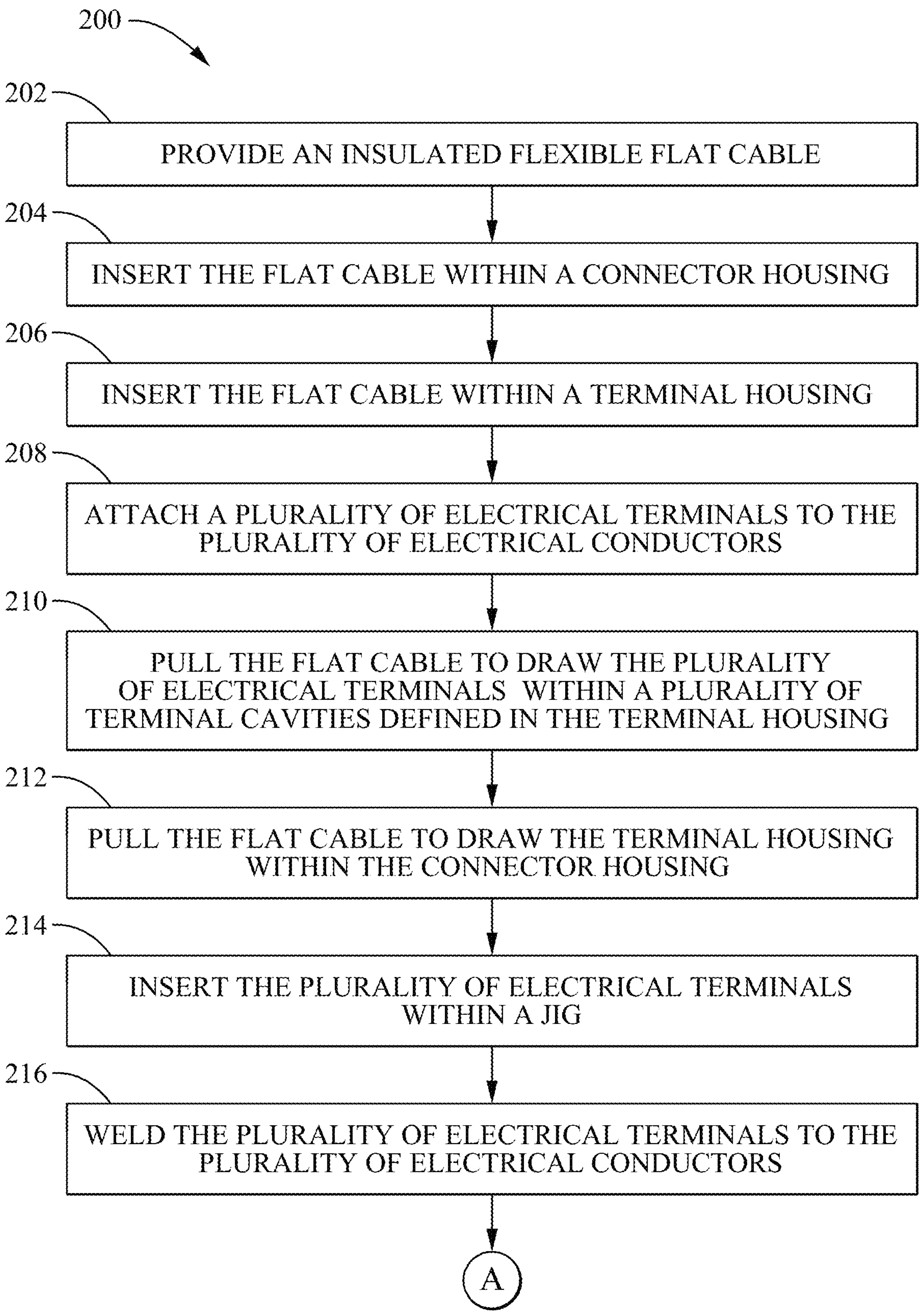
FIG. 13 is an exploded isometric view of the electrical connector of FIG. 1 showing the subassembly of FIG. 12 and a terminal cap configured to be attached to the terminal housing in an embodiment of the invention.
Figure 13:
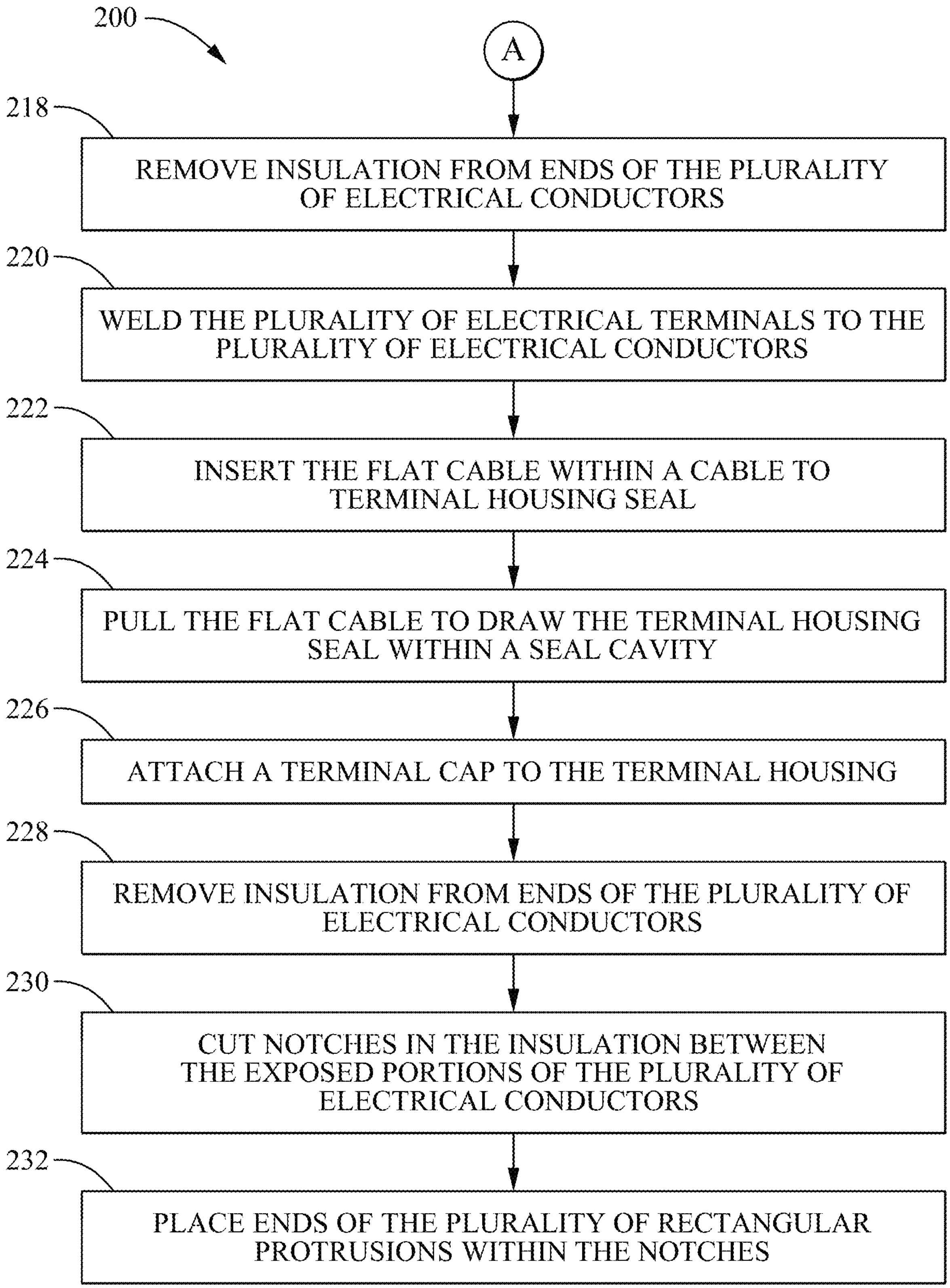

A flow chart of the method 200 of assembling the electrical connector 100 is shown in FIG. 13.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. A method of assembling an electrical connector, comprising:
- a) providing an insulated flexible flat cable having a plurality of electrical conductors;
- b) inserting the flat cable within a connector housing;
- c) inserting the flat cable within a terminal housing;
- d) attaching a plurality of electrical terminals to the plurality of electrical conductors;
- e) pulling the flat cable to draw the plurality of electrical terminals within a plurality of terminal cavities defined in the terminal housing;
- f) pulling the flat cable to further draw the terminal housing within the connector housing; and
- g) attaching the plurality of electrical terminals to the plurality of electrical conductors while the plurality of electrical terminals are held in a jig.

2. The method according to claim 1, wherein the plurality of electrical conductors have a generally rectangular cross section and wherein the method further comprises:
- h) removing insulation from ends of the plurality of electrical conductors, thereby exposing portions of the plurality of electrical conductors; and
- i) folding the plurality of electrical conductors over edges of the plurality of electrical terminals.

3. The method according to claim 1, wherein the plurality of electrical terminals are selected from a list consisting of male blade terminals and female tuning fork terminals.

4. The method according to claim 1, wherein the terminal housing includes a terminal housing to connector housing seal and wherein the method further comprises:
- j) inserting the flat cable within a cable to terminal housing seal; and
- k) pulling the flat cable to draw the terminal housing seal within a seal cavity defined in the terminal housing.

5. The method according to claim 4, wherein step j) occurs prior to step c).

6. The method according to claim 1, wherein the method further comprises:
- l) attaching a terminal cap to the terminal housing.

7. The method according to claim 6, wherein the terminal cap defines a plurality of rectangular protrusions located between the plurality of electrical terminals and wherein the terminal housing defines a plurality of slots located between the plurality of electrical terminals in which the plurality of rectangular protrusions are received.

8. The method according to claim 7, wherein the method further comprises:
- m) removing insulation from ends of the plurality of electrical conductors, thereby exposing portions of the plurality of electrical conductors;
- n) cutting notches in the insulation between the exposed portions of the plurality of electrical conductors; and
- o) placing ends of the plurality of rectangular protrusions within the notches.

9. An electrical connector produced by a process comprising:
- a) providing an insulated flexible flat cable having a plurality of electrical conductors;
- b) inserting the flat cable within a connector housing;
- c) inserting the flat cable within a terminal housing;
- d) attaching a plurality of electrical terminals to the plurality of electrical conductors;
- e) pulling the flat cable to draw the plurality of electrical terminals within a plurality of terminal cavities defined in the terminal housing;
- f) pulling the flat cable to further draw the terminal housing within the connector housing; and
- g) attaching the plurality of electrical terminals to the plurality of electrical conductors while the plurality of electrical terminals are held in a jig.

10. The electrical connector according to claim 9, wherein the plurality of electrical conductors have a generally rectangular cross section and wherein the process further comprises:
- h) removing insulation from ends of the plurality of electrical conductors, thereby exposing portions of the plurality of electrical conductors; and
- i) folding the plurality of electrical conductors over edges of the plurality of electrical terminals.

11. The electrical connector according to claim 9, wherein the terminal housing includes a terminal housing to connector housing seal and wherein the process further comprises:
- j) inserting the flat cable within a cable to terminal housing seal; and
- k) pulling the flat cable to draw the terminal housing seal within a seal cavity defined in the terminal housing.

12. The electrical connector according to claim 9, wherein the process further comprises:
- l) attaching a terminal cap to the terminal housing.

13. The electrical connector according to claim 12, wherein the terminal cap defines a plurality of rectangular protrusions located between the plurality of electrical terminals and wherein the terminal housing defines a plurality of slots located between the plurality of electrical terminals in which the plurality of rectangular protrusions are received.

14. The electrical connector according to claim 13, wherein the process further comprises:
- m) removing insulation from ends of the plurality of electrical conductors, thereby exposing portions of the plurality of electrical conductors;
- n) cutting notches in the insulation between the exposed portions of the plurality of electrical conductors; and
- o) placing ends of the plurality of rectangular protrusions within the notches.

15. An electrical connector assembly, comprising:
- an insulated flexible flat cable having a plurality of electrical conductors, wherein a portion of each of the plurality of electrical conductors is exposed;
- a plurality of electrical terminals formed of unfolded sheet metal and attached to the plurality of electrical conductors, wherein the plurality of electrical conductors are folded over edges of the exposed portions of the plurality of electrical conductors;
- a terminal housing having a plurality of terminal cavities in which the plurality of electrical terminals is disposed;
- a terminal cap attached to an end of the terminal housing; and
- a connector housing in which the terminal housing is disposed.

16. The electrical connector assembly according to claim 15, wherein the terminal cap defines a plurality of rectangular protrusions located between the plurality of electrical terminals and wherein the terminal housing defines a plurality of slots located between the plurality of electrical terminals in which the plurality of rectangular protrusions are received.

17. The electrical connector assembly according to claim 16, wherein the flat cable defines notches in the insulation between the exposed portions of the plurality of electrical conductors and ends of the plurality of rectangular protrusions are disposed within the notches.

18. The electrical connector assembly according to claim 15, wherein the plurality of electrical terminals are selected from a list consisting of male blade terminals and female tuning fork terminals.

* * * * *